July 9, 1940.  H. GASS  2,207,400
VALVE STEM PACKING
Filed Dec. 19, 1939
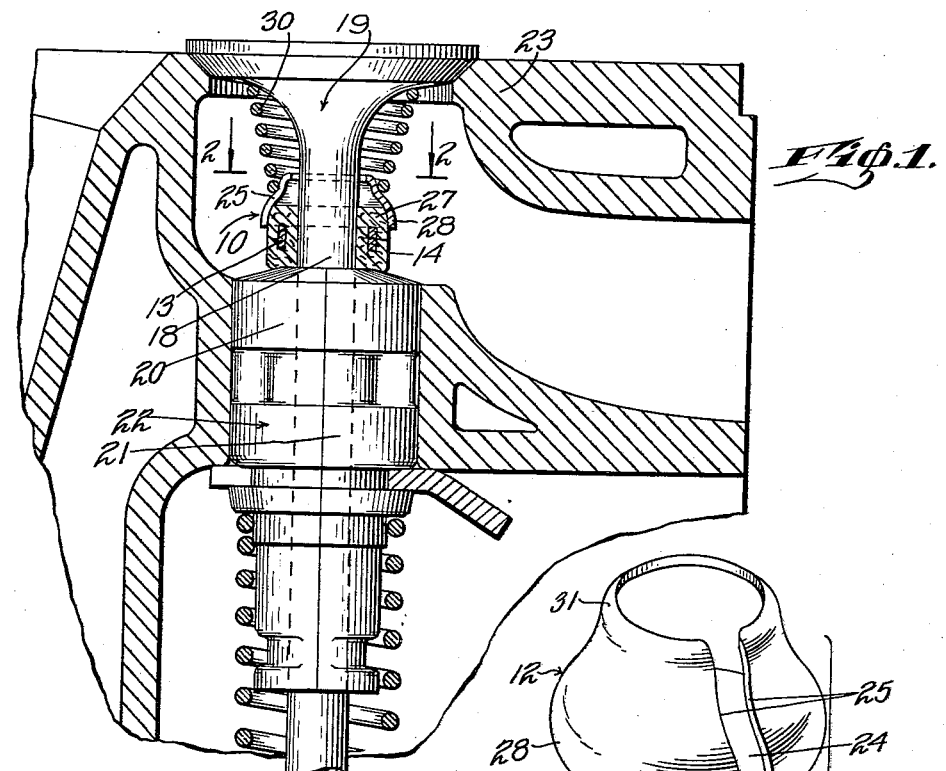
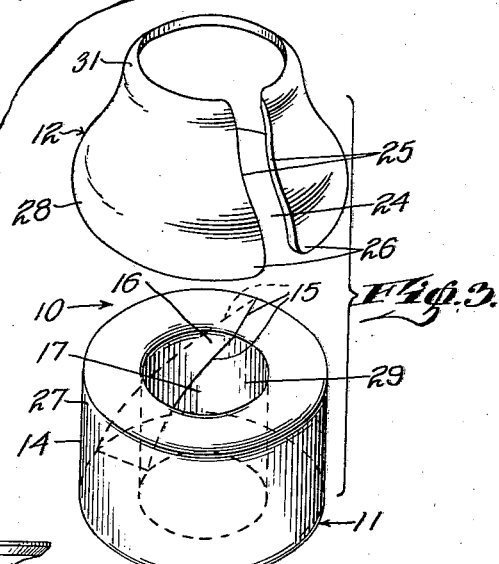
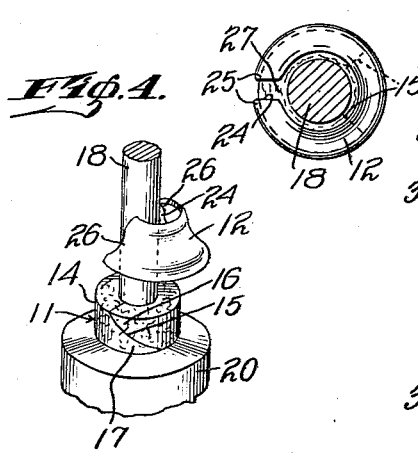
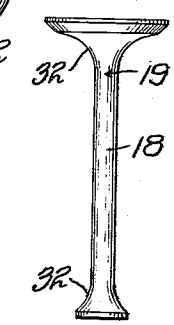
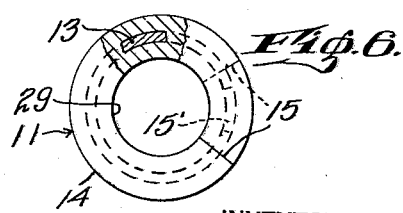
INVENTOR
Harold Gass
BY
ATTORNEY Patented July 9, 1940

2,207,400

UNITED STATES PATENT OFFICE 2,207,400

VALVE STEM PACKING

Harold Gass, New York, N. Y.

Application December 19, 1939, Serial No. 309,985

5 Claims. (Cl. 286—30)

The present invention is concerned with internal combustion valve stem packings and is chiefly directed to an improved packing particularly applicable to all types of intake valve stems and especially applicable to the well known mushroom head valve. Hitherto and in so far as I am aware to replace valve stem packings in internal combustion engines, the valves thereof had to be removed from the engine. This required appreciable time and labor. By the present invention this inconvenience is eliminated and consequently one object of the invention is realized in the provision of a relatively inexpensive and serviceable packing of the type alluded to that may be readily assembled on the valve stem without removing the latter from the engine. Another important object of the invention resides in the provision of a novel and durable packing comprising superimposed and closely but removably associated annular and split members adapted to be assembled while surrounding the valve stem in initially opening these members whereby the latter may be severally and conveniently snapped over the body of the valve stem to operatively surround the latter, and thereafter be readily assembled in operative sealing relation while surrounding the valve stem. Other important objects, and functional and structural features and advantages of the invention will be more readily appreciated and apparent when considered in the light of the following detailed description and the accompanying drawing wherein:

Fig. 1 is a fragmentary sectional view of an internal combustion engine showing my improved packing mounted on the intake valve stem.

Fig. 2 is a sectional view on the line 2—2 of Fig. 1.

Fig. 3 is an exploded view of the packing shown in Fig. 1.

Fig. 4 is a perspective view showing the manner of assembling the resilient split cap of the packing on the split compressible and annular sealing washer thereof.

Fig. 5 is an elevational view of an intake valve adapted to be sealed by the packing according to the invention, and Fig. 6 is a plan view of the compressible and split annular sealing member, shown partly broken away.

Illustrative of the embodiment disclosed, the packing generally denoted 10 comprises a split and deformable sealing ring 11 and the split retaining cap or holder 12. The sealing ring 11 has a deformable and non-resilient metal and split core 13 which may be of lead or the like covered by suitable asbestos casing 14 impregnated with graphite. The annular sealing ring 11 is provided with a biased or inclined kerf 15 defining a lap joint comprising the overlapped separable and tapered ends 16 and 17 which may be readily separated or opened to provide a relatively large gap to receive and closely encompass the valve stem 18 of the intake valve 19 slidably or reciprocably associated with separable components 20 and 21 of a bushing 22 appropriately fixed within the engine case 23.

The retaining cap 12 however is of a suitable spring metal. It is substantially frusto-conical in form and is provided along the length of its hollow contracted and flared skirt with the relatively wide gap 24.

With sides 25 of gap 24 in the position illustrated in Fig. 3, the spacing between these sides is appreciably less than the diameter of the stem of the valve. However due to the resiliency of the metal of the cap or retainer 12, wings 26 of the latter may be separated as indicated in Fig. 4, thus widening gap 24 to receive the body of the valve stem 18 after which the force which may be by a tool of hand causing separation of the wings is removed and wings 26 automatically retract and are again restored to their normal spaced relation as shown in Fig. 3 although the cap 12 now surrounds the valve stem.

Where the deformable sealing ring 11 is mounted on stem 18 and with the retaining cap or cup 12 above the ring (Fig. 4), the cap is then moved against the ring and frictionally and telescopically receives the upper rim 27 of the sealing ring 11 thus slightly stressing the lower rim 28 of the cap and therefore the reacting force on the upper rim holds the lapped terminals 16 and 17 together or closed that is the inherent peripheral reaction or tension of the lower rim 28 of the split cup on rim 27 normally holds the lower sealing ring together and in seal tight fashion against the valve stem as required even in instances where the valve stem is slidably lifted or opened from its valve seat. Therefore in the overlapped relation of terminals 16 and 17 the latter slightly compensate themselves to reduce the size of the bore 29 of the sealing ring 11 when the valve stem wears. It is thus apparent that by the present arrangement the sealing ring is held against the valve stem even during wear of the latter because the normal peripheral tensioning action of the cap tends to hold the overlapped tapered terminals 16 and 17 in their proper relation to operatively hold the inner compensatory bore 29 sealed tight against the exterior surface of the slidable valve stem. Once assembled cap 12 is frictionally bound to the sealing ring 11 and is thus prevented from accidental separation and such separation is also prevented by reason of the helicoidal spring 30 interposed between the valve and the contracted part 31 of the cup 12.

Briefly recapitulating, it should be observed, that by the present arrangement it is not necessary to disconnect the valve from the engine in the matter of applying the valve packing according to the invention and to this end, the sealing ring is first opened and then closed about the valve stem after which the resilient cap 12 is spread and snapped over the valve stem and moved along the stem and against the sealing ring and the upper part of the latter is frictionally and firmly held whereby the tapered terminals 16 and 17 move towards each other to permit the bore of the sealing ring to be in seal tight engagement with the valve stem. It is thus apparent that the present packing containing two split complementary members may be readily sprung over even flared portions 32 of the valve stem and in the assembled relation of the packing the inclined kerf 15 is desirably positioned diametrically opposite gap 24, the kerf 15 in fact extends in an inclined fashion over the entire height of the hollow annular seal 11 and of course splits or interrupts the deformable metal core 13 at 15'.

To remove the packing from the valve stem, the skirt part thereof may be readily separated by moving wings away from each other by a suitable tool and thereafter removed from the split ring 11 and from the valve stem after which the deformable ring is opened and removed.

Without further analysis, the foregoing disclosure will so fully reveal the gist of the present invention that others can by applying current knowledge readily adapt it to various applications without omitting certain features, that from the standpoint of the prior art, fairly constitute the essential characteristics of the generic and specific aspect of the invention and therefore such adaptations should and are intended to be comprehended within the meaning and range of equivalency of the following claims.

I claim:

1. In a packing for a valve stem, an annular sealing member provided with an inclined kerf and defining superimposed and overlapped terminals adapted to be initially separated to receive said stem and subsequently closed to permit the bore of said member to closely surround said stem, and a one piece annular resilient and split retaining cap having a skirt including spaced wings normally spaced a distance less than the diameter of said stem but corresponding to a substantial portion of said diameter whereby said wings will be sprung apart by the camming action of said stem when said skirt is forced against the outer surface of said stem to receive the latter preparatory to moving said skirt towards said member and along said stem whereby said skirt telescopically receives the upper portion of said member, said skirt in the telescopic relation of the latter and said member frictionally holding said member to maintain said overlapped terminals closed and said bore in seal tight relation against said stem.

2. In a packing for a valve stem, an annular and compressible sealing member provided with an inclined kerf and defining superimposed and overlapped terminals adapted to be initially separated to receive said stem and subsequently closed to permit the bore of said member to closely surround said stem, and an annular resilient and split one piece cap having a flared skirt including spaced wings normally spaced a distance less than the diameter of said stem but corresponding to a substantial portion of said diameter whereby said wings will be sprung apart by the camming action of said stem when said skirt is forced against the outer surface of said stem to receive the latter preparatory to moving said skirt towards said member and along said stem whereby said skirt telescopically receives the upper portion of said member, said skirt in the telescopic relation of the latter and said member frictionally holding said member to maintain said overlapped terminals closed and said bore in seal tight relation against said stem.

3. In a packing for a valve stem, an annular deformable and non-resilient sealing member provided with an inclined kerf and defining superimposed and overlapped terminals adapted to be initially separated to receive said stem and subsequently closed to permit the bore of said member to closely surround said stem, and an annular resilient and split substantially frustoconical one piece retaining cap having a skirt including spaced wings normally spaced a distance less than the diameter of said stem but corresponding to a substantial portion of said diameter whereby said wings will be sprung apart by the camming action of said stem when said skirt is forced against the outer surface of said stem to receive the latter preparatory to moving said skirt towards said member and along said stem whereby said skirt telescopically receives the upper portion of said member, said skirt in the telescopic relation of the latter and said member exerting a circumferential pressure against the latter for frictionally holding said member to maintain said overlapped terminals closed and said bore in seal tight relation against said stem.

4. In a packing for a valve stem, an annular deformable sealing member provided with an inclined kerf extending over substantially the entire height thereof and defining superimposed and overlapped and tapered terminals adapted to be initially separated to receive said stem and subsequently closed to permit the bore of said member to closely surround said stem, and an annular resilient and split one piece retaining cap having a skirt including spaced wings normally spaced a distance less than the diameter of said stem but corresponding to a substantial portion of said diameter whereby said wings will be sprung apart by the camming action of said stem when said skirt is forced against the outer surface of said stem to receive the latter preparatory to moving said skirt towards said member and along said stem whereby said skirt telescopically receives the upper portion of said member, said skirt in the telescopic relation of the latter and said member resiliently and frictionally holding said member to maintain said overlapped terminals closed and said bore in tight relation against said stem.

5. In a packing for a valve stem, an annular sealing member comprising a non-resilient and deformable annular core and a one piece deformable annular casing enveloping said core, said core having a kerf, said casing having a kerf in alinement with the kerf of said core, said member having overlapped terminals defined by said kerfs and adapted to be separated to receive said stem and subsequently closed to permit the bore of said member to closely surround said stem, and a one piece annular resilient and split retaining cap having a skirt including spaced wings normally spaced a distance less than the diameter of said stem but corresponding to a substantial portion of said diameter whereby said wings will be sprung apart by the camming action of said stem when said skirt is forced against the outer surface of said stem to receive the latter preparatory to moving said skirt towards said member and along said stem whereby said skirt telescopically receives the upper portion of said member, said skirt in the telescopic relation of the latter and said member frictionally holding said member to maintain said overlapped terminals closed and said bore in seal tight relation against said stem.

HAROLD GASS.